G. JACOBS.
RESILIENT WHEEL.
APPLICATION FILED SEPT. 3, 1918.

1,352,752.

Patented Sept. 14, 1920.
2 SHEETS—SHEET 1.

Inventor
GEORGE JACOBS

By

Attorneys

G. JACOBS.
RESILIENT WHEEL.
APPLICATION FILED SEPT. 3, 1918.
1,352,752.
Patented Sept. 14, 1920.
2 SHEETS—SHEET 2.
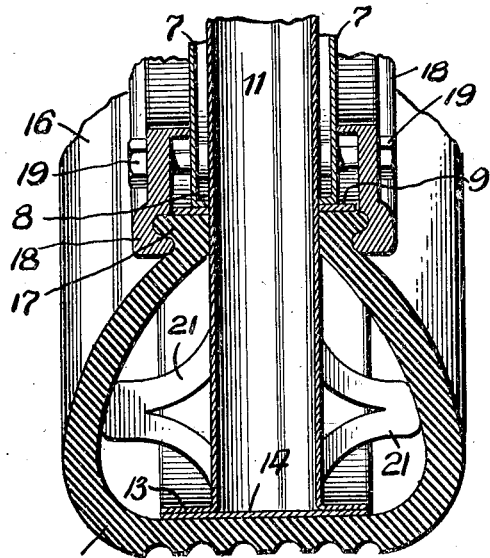
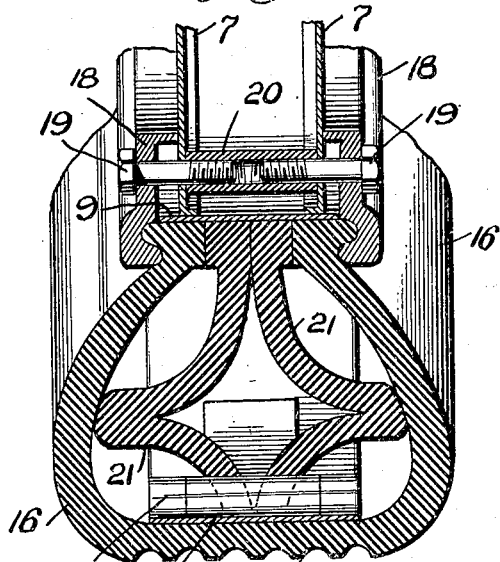
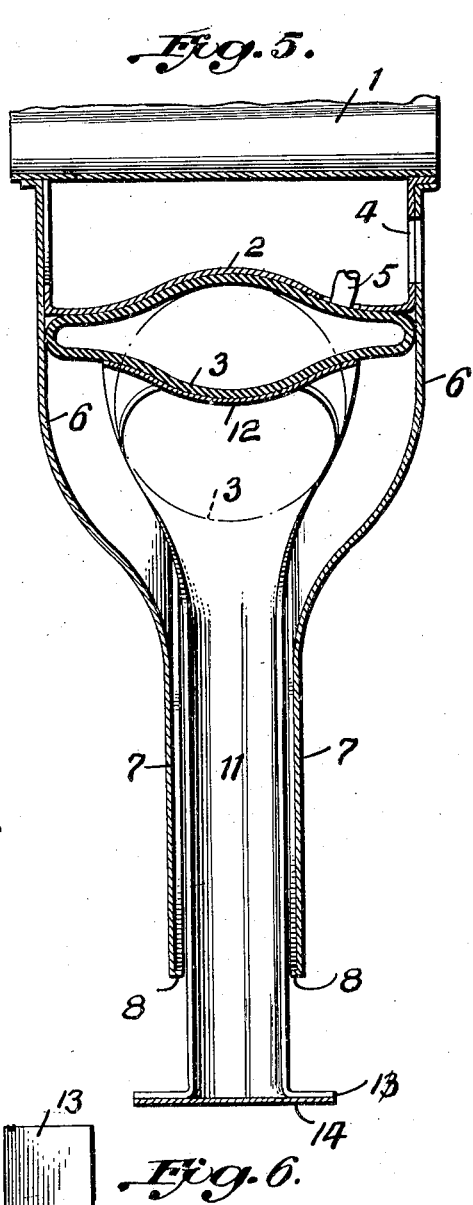
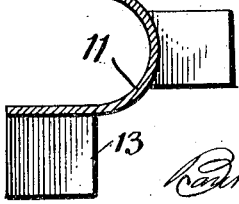
Inventor
GEORGE JACOBS
By
Attorneys

UNITED STATES PATENT OFFICE.

GEORGE JACOBS, OF DETROIT, MICHIGAN.

RESILIENT WHEEL.

1,352,752.

Specification of Letters Patent.  Patented Sept. 14, 1920.

Application filed September 3, 1918.  Serial No. 252,340.

*To all whom it may concern:*

Be it known that I, GEORGE JACOBS, a citizen of the United States of America, residing at Detroit, in the county of Wayne and State of Michigan, have invented certain new and useful Improvements in Resilient Wheels, of which the following is a specification, reference being had therein to the accompanying drawings.

My invention aims to provide a resilient vehicle wheel that may be advantageously used in connection with automobiles, the wheel including novel means at the hub and periphery of the wheel for cushioning the same when encountering rough and irregular surfaces. The cushioning means at the hub of the wheel includes a pneumatic annular member susceptible to compression by double spokes arranged to bear upon the annular member and slide in the felly member of the wheel. At the outer ends of the spokes is a yieldable or resilient casing containing shoes and cushion members, the cushion members being in the form of sections cut from a discarded outer tire casing.

One feature of my resilient wheel is the outer tire casing which has a limited flattening or yielding movement, and as the outer casing is compressed due to a load it assumes a shape which prevents the wheel from sliding or skidding on smooth surfaces or when rounding a curved road or street corner.

Another feature of my invention is that of inclosing the spokes of the wheel by metallic side plates or disks, and with no wood entering into the construction of the wheel, there is a rigid and durable wheel frame work in which the shiftable spokes and cushioning members can be compactly arranged.

A further feature of my invention is that of utilizing old rubber tire casings as cushioning members, the tire casings being cut into sections so that the sections may be fitted in the casing of my wheel to maintain the casing normally distended and yet permit of the same yielding under a load.

My invention will be hereinafter more fully considered and then claimed, and reference will now be had to the drawings, wherein Figure 1 is a side elevation of a portion of the resilient wheel, partly broken away and partly in section, showing a portion of the wheel under compression;

Fig. 3 is an enlarged cross sectional view taken on the line III—III of Fig. 1;

Fig. 4 is a similar view taken on the line IV—IV of Fig. 1;

Fig. 5 is an enlarged cross sectional view taken on the line V—V of Fig. 1, and

Fig. 6 is a transverse sectional view of a portion of a spoke.

Figure 2:
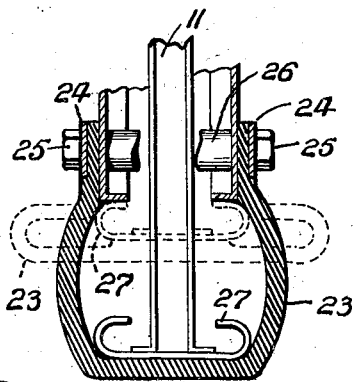
Fig. 2 is a cross sectional view of a portion of a modified form of tire.

In the drawings, the reference numeral 1, denotes a hub adapted to be placed on the end of an axle or driven shaft and said hub may be designed for various kinds of vehicles. 2 denotes an annular concave member mounted on the hub 1, said member having the periphery thereof provided with a concave seat for a pneumatic annular cushioning member 3, which under compression, as shown in Fig. 5, may be somewhat flattened on the concave member 2. The concave member 2 may have a suitable opening 4 so that easy access may be had to a filling tube 5 of the annular pneumatic member 3.

Connected, by spot welding or other suitable means to the hub 1 and the sides of the concave member 2 are circular side plates 6 preferably in the form of rolled or pressed steel disks that have the outer or peripheral edges thereof inset and placed in parallelism, as at 7, the extreme peripheral edges of said side plates having inturned flanges 8.

Figure 1:
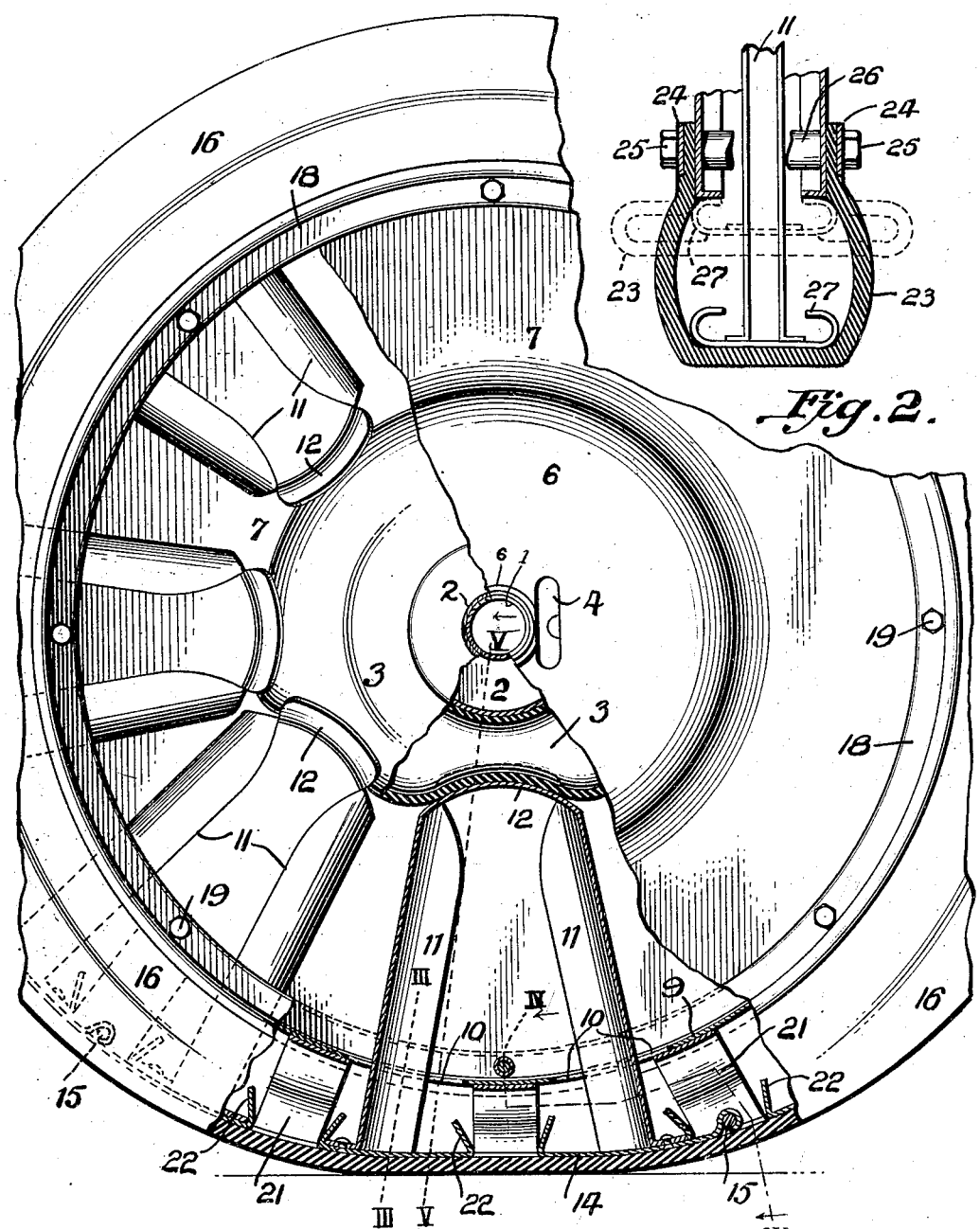

9 denotes a felly member or band fixed on the flanges 8 of the side plates 7 and said band is slotted, as at 10, to provide clearance for double spokes 11. The spokes 11 are made of channel metal in the form of strips which are bent intermediate the ends thereof to form legs or spokes that extend through the slots 10 of the felly member. The channel strips, intermediate the ends thereof, have the flanges bent to form seats 12 for the annular pneumatic hub member 3, as best shown in Fig. 1, and the outer ends of the spokes are provided with feet 13 adapted to be riveted, spot welded, or otherwise connected, to segment shaped shoes 14 having the ends thereof hingedly or pivotally connected together, as at 15. The shoes 14 are disposed circumferentially of the felly member and in spaced relation thereto so as to fit against the inner wall of an outer casing 16 placed about the shoes 14 and the outer ends of the double spokes 11. The outer casing 16 is made of rubber and has clencher edges 17, somewhat similar to the edges of an ordinary outer tire casing, so that the clencher edges of the outer casing 16 may be held by retaining rings 18. The retaining rings 18 are placed against side plates 7, at the peripheral edges thereof and are connected together by screw bolts 19 entering spacer sleeves 20 between the side plates 7, said spacer sleeves being located between the legs of each double spoke 11.

The space between the clencher edges 17 of the outer casing 16 provides clearance for the double spokes and also permits of cushion members 21 being placed between the clencher edges 17 as shown in Fig. 4, to bear against the inner walls of the outer casing 16. As set forth in the beginning, the cushion members 21 are sections of an old or discarded outer tire casing, and these sections abut opposed side walls of the outer casing 16 and engage the shoes 14 between upstruck angularly disposed lugs 22 of the shoes 14. This is best shown in Fig. 1 and the resiliency of the outer casing 16 and the cushion members 21 is adapted to coöperate with the pneumatic hub member 3 in yieldably supporting the rigid portion of the wheel.

In Fig. 2 of the drawings, there is illustrated a slight modification of my invention wherein the outer casing 23 has its edges provided with wear plates 24, and these edges are held in engagement on the outer sides of the side plates 7 by screw bolts 25 entering spacer sleeves 26 between the side plates 7. The outer ends of the double spokes 11 are provided with shoes 27 and by these shoes contacting with the peripheral edges of the side plates 7 the compression or collapse of the outer casing 23 is limited as shown by dotted lines in Fig. 2.

From the foregoing, it will be observed that the pneumatic hub member is protected against puncture and by eliminating the usual form of an inner pneumatic tube, vulcanizing is dispensed with and even should the outer casing be punctured or injured it is still possible to use the wheel. A few of the advantages of my improved construction have been set forth, and it is thought that the utility of the wheel will be apparent without further description. While in the drawings there are illustrated the preferred embodiments of my invention, it is to be understood that the structural elements are susceptible to such variations and modifications as fall within the scope of the appended claims.

What I claim is:—

1. A resilient wheel comprising a hub, an annular pneumatic member on said hub, double spokes having seats bearing on said pneumatic member, shoes at the outer ends of said double spokes and having the ends thereof connected together, an outer casing inclosing said shoes, and side plates connected to said hub and holding said outer casing.

2. A resilient wheel comprising a hub, a concave member on said hub, an annular pneumatic member on said concave member, double spokes having seats bearing on said pneumatic member, articulated shoes carried by the outer ends of said spokes, an outer casing on said shoes, and side plates connected to said concave member and holding said outer casing.

3. A resilient wheel comprising a hub, an annular pneumatic member on said hub, double spokes having seats bearing on said pneumatic member, side plates connected to said hub, a felly member supported by said side plates and through which the spokes extend, an outer casing on said felly member, and cushion members in said outer casing between said double spokes.

4. A resilient wheel comprising a hub, an annular pneumatic member on said hub, double spokes having seats engaging said pneumatic member, shoes carried by the outer ends of said spokes, a casing on said shoes, and means connecting the edges of said casing to said hub.

5. A resilient wheel comprising a hub, an annular pneumatic member on said hub, side plates connected to said hub and inclosing said pneumatic member, double spokes between said side plates and engaging said pneumatic member, an outer casing having its edges held on said side plates and inclosing the outer ends of said double spokes, and cushion members in said outer casing.

6. A resilient wheel comprising a hub, a cushion member on said hub, side plates connected to said hub and inclosing the cushion member, a slotted felly member carried by said side plates, double spokes extending through said felly member and engaging said cushion member, an outer casing inclosing the outer ends of said double spokes and having the edges connected to said side plates, and cushion members in said outer casing between said spokes and bearing on said felly member and against the opposed side walls of said outer casing.

7. In a resilient wheel, a hub, an annular pneumatic member about said hub, side plates connected to said hub, a felly member supported by said side plates, double spokes extending through said felly member and engaging said pneumatic member, articulated shoes connected to the outer ends of said double spokes, an outer casing on said shoes having its edges connected to said side plates, and cushion members between said shoes and said felly member in said outer casing and held by said shoes.

In testimony whereof I affix my signature in the presence of two witnesses.

GEORGE JACOBS.

Witnesses:
KARL H. BUTLER,
ANNA M. DORR.